US012758054B2

United States Patent
Li

(12) United States Patent
(10) Patent No.: US 12,758,054 B2
(45) Date of Patent: Oct. 13, 2026

(54) FRESHNESS-RETAINING SEALED JAR

(71) Applicant: Xiufang Li, Xiamen (CN)

(72) Inventor: Xiufang Li, Xiamen (CN)

( * ) Notice: Subject to any disclaimer, the term of this patent is extended or adjusted under 35 U.S.C. 154(b) by 0 days.

(21) Appl. No.: 19/247,691

(22) Filed: Jun. 24, 2025

(65) Prior Publication Data

US 2025/0318691 A1 Oct. 16, 2025

(30) Foreign Application Priority Data

May 23, 2025 (CN) ........................ 202521029089.4

(51) Int. Cl.

| | |
|---|---|
| ***A47J 47/10*** | (2006.01) |
| ***B65D 23/00*** | (2006.01) |
| ***B65D 23/08*** | (2006.01) |
| ***B65D 43/02*** | (2006.01) |
| ***B65D 53/00*** | (2006.01) |

(52) U.S. Cl.

CPC ............ *A47J 47/10* (2013.01); *B65D 23/001* (2013.01); *B65D 23/085* (2013.01); *B65D 43/0222* (2013.01); *B65D 53/00* (2013.01); *B65D 2251/0018* (2013.01); *B65D 2251/0081* (2013.01); *B65D 2251/20* (2013.01); *B65D 2543/005* (2013.01)

(58) Field of Classification Search

CPC .... B65D 45/32; B65D 23/0842; B65D 41/22; B65D 55/08; A47J 47/10

See application file for complete search history.

(56) References Cited

U.S. PATENT DOCUMENTS

| | | | | |
|---|---|---|---|---|
| 1,858,139 | A * | 5/1932 | Dailey | B65D 41/22 215/317 |
| 4,542,833 | A * | 9/1985 | DeVaughn | B65D 41/22 215/DIG. 1 |
| 8,978,906 | B2 * | 3/2015 | Feeley | A61J 9/08 215/11.1 |
| 10,220,984 | B1 * | 3/2019 | Vigoureux | B65D 41/22 |
| 2015/0359365 | A1 * | 12/2015 | Feeley | A47G 19/2272 220/713 |
| 2015/0360827 | A1 * | 12/2015 | Ting | B65D 41/0485 215/305 |
| 2017/0174411 | A1 | 6/2017 | Lonner et al. | |
| 2018/0195787 | A1 | 7/2018 | Benitsch et al. | |
| 2022/0089350 | A1 | 3/2022 | Dinkheller | |

* cited by examiner

*Primary Examiner* — Jeffrey R Allen

(74) *Attorney, Agent, or Firm* — Hemisphere Law, PLLC

(57) ABSTRACT

A freshness-retaining sealed jar is provided, which belongs to the technical field of sealed jars. The freshness-retaining sealed jar includes a glass jar. A silicone lid is arranged at a top of the glass jar. A bottom silicone cover is arranged at a bottom of the glass jar. A silicone rubber band is arranged at a periphery of the silicone lid and is configured to bind the silicone lid to a top opening of the glass jar. The silicone lid includes a concave top plate and a curtain-like enclosure that are integrally formed. The curtain-like enclosure is arranged at a bottom edge of the concave top plate and is wrapped around an outer side of the glass jar. A side top wall of the glass jar is arranged between an inner side wall of the concave top plate and an inner side wall of the curtain-like enclosure.

6 Claims, 5 Drawing Sheets

FRESHNESS-RETAINING SEALED JAR

TECHNICAL FIELD

The present disclosure provides a freshness-retaining sealed jar, and belongs to the technical field of sealed jars.

BACKGROUND

When making pickles, in order to seal and store the pickles properly, a sealed jar is usually used. Green vegetables to be pickled are placed into a glass jar, and then an opening of the glass jar is covered with a traditional non-deformable lid such as a bamboo lid, a wooden lid, or an aluminum lid for sealing.

The above structure can basically meet normal usage requirements. However, due to the characteristics of a combustion process of the glass bottle, the opening of the glass bottle has a large size tolerance, so it is difficult to make the traditional lid in an appropriate size to match the opening, causing poor sealing performance in the bamboo lid or the wooden lid. Moreover, the bamboo lid or the wooden lid may get moldy. The aluminum lid also has poor sealing performance. In addition, gas generated during pickling can easily cause the lid to burst or deform, making it difficult to remove the lid. In order to ensure the sealing performance, an elder with traditional habits also uses a plastic bag to cover the opening of the glass jar, and then ties the plastic bag with a string for sealing, but it is often inconvenient to remove the lid. Based on this, the present disclosure provides a freshness-retaining sealed jar.

SUMMARY

Technical problems solved in the present disclosure are as follows: A bamboo lid and a wooden lid have poor sealing performance and may get moldy. An aluminum lid also has poor sealing performance. Gas generated during pickling can easily cause the lid to burst or deform, making it difficult to remove the lid. It is inconvenient to remove the lid because a plastic bag is used to cover an opening and tied with a string.

In order to solve the technical problems, technical solutions of the present disclosure are as follows: A freshness-retaining sealed jar includes a glass jar. A silicone lid is arranged at a top of the glass jar. A bottom silicone cover is arranged at a bottom of the glass jar. A silicone rubber band is arranged at a periphery of the silicone lid and is configured to bind the silicone lid to a top opening of the glass jar. The silicone lid includes a concave top plate and a curtain-like enclosure that are integrally formed. The curtain-like enclosure is arranged at a bottom edge of the concave top plate and is wrapped around an outer side of the glass jar. A side top wall of the glass jar is arranged between an inner side wall of the concave top plate and an inner side wall of the curtain-like enclosure.

Further, limiting protrusions located on two sides of the silicone rubber band are arranged on an upper wall of an outer side of the curtain-like enclosure.

Further, the curtain-like enclosure is in a shape of a horn cover. The glass jar is in a shape with a large top opening and a small bottom.

Further, the bottom silicone cover includes a bottom plate and a ferrule that are integrally formed. The ferrule is arranged at a top edge of the bottom plate and abuts against an outer side wall of the glass jar.

Further, a through hole is provided in a center of a bottom of the bottom plate. A plurality of antislip protrusions located on an outer side of the through hole are arranged in a circumference of the bottom of the bottom plate.

Beneficial effects of the present disclosure are as follows:

The silicone rubber band binds the silicone lid to the opening of the glass jar. At this time, the opening of the glass jar is sealed and covered with the silicone lid, so that the scaling and freshness retaining performance is good. Gas generated in the glass jar during pickling can only prop up the concave top plate and make the concave top plate deform. When the freshness-retaining sealed jar needs to be opened, the silicone rubber band is pushed outwards under force and is removed from the curtain-like enclosure, and then the silicone lid can be removed conveniently. It is easy to open or close the jar, and a silicone material is environmentally friendly and gets moldy hardly.

Figure 1:
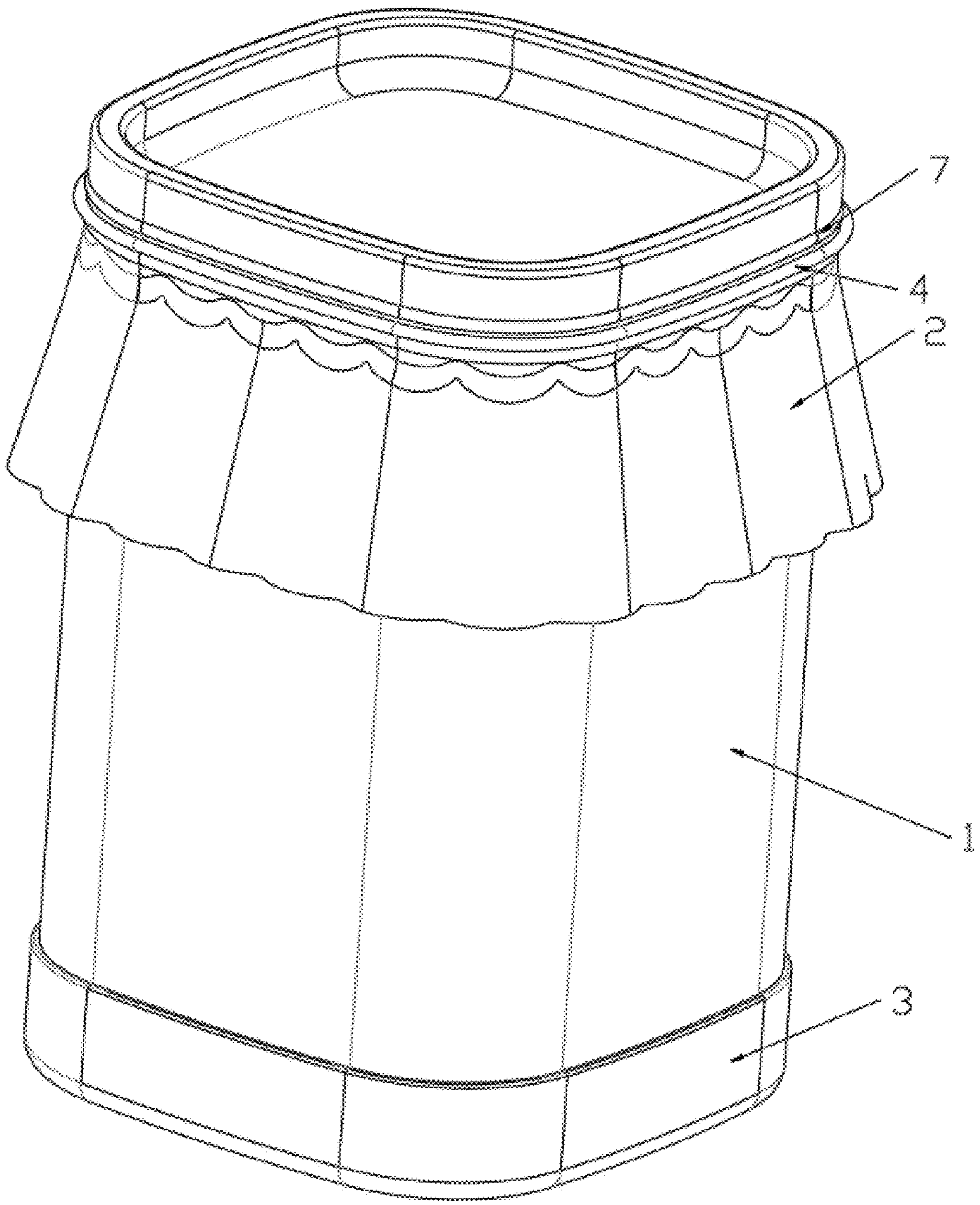
FIG. 1 is a schematic structural diagram of a freshness-retaining sealed jar according to the present disclosure.

1: glass jar; 2: silicone lid; 3: bottom silicone cover; 4: silicone rubber band; 5: concave top plate; 6: curtain-like enclosure; 7: limiting protrusion; 8: bottom plate; 9: ferrule; 10: through hole; and 11: antislip protrusion.

DETAILED DESCRIPTION OF THE EMBODIMENTS

Directional terms mentioned or possibly mentioned in this specification, such as up, down, left, right, front, back, top surface, bottom surface, top, and bottom, are defined relative to their structures and are relative concepts. Therefore, these terms may correspondingly change based on different positions and usage states. Therefore, these or other directional terms should not be interpreted as restrictive terms.

The singular forms of "one" and "the" used in this specification are also intended to include a plural form, unless the context clearly indicates other meanings. It should also be understood that the term "and/or" used herein includes any or all combinations of one or more related listed items.

To make the technical problems to be resolved in the present disclosure, the technical solutions, and beneficial effects more comprehensible, the following further describes the present disclosure in detail with reference to the accompanying drawings and implementations. It should be understood that the implementations described herein are merely used to explain the present disclosure but are not intended to limit the present disclosure.

As shown in FIG. 1 to FIG. 4, the present disclosure provides a freshness-retaining sealed jar, including a glass jar 1. The glass jar 1 is in a shape with a large top opening and a small bottom.

A silicone lid 2 is arranged at a top of the glass jar 1. A silicone rubber band 4 is arranged at a periphery of the silicone lid 2 and is configured to bind the silicone lid 2 to the top opening of the glass jar 1. The silicone lid 2 includes a concave top plate 5 and a curtain-like enclosure 6 which is in a shape of a horn cover, and the concave top plate 5 and the curtain-like enclosure 6 are integrally formed. The curtain-like enclosure 6 is arranged at a bottom edge of the concave top plate 5 and is wrapped around an outer side of the glass jar 1. A side top wall of the glass jar 1 is arranged between an inner side wall of the concave top plate 5 and an inner side wall of the curtain-like enclosure 6. Limiting protrusions 7 located on two sides of the silicone rubber band 4 are arranged on an upper wall of an outer side of the curtain-like enclosure 6, to play a role in limiting the silicone rubber band 4. Specifically, the silicone rubber band 4 binds the curtain-like enclosure 6 to an outer side wall of the glass jar 1, and in this case, the opening of the glass jar 1 is sealed and covered with the silicone lid 2.

Figure 2:
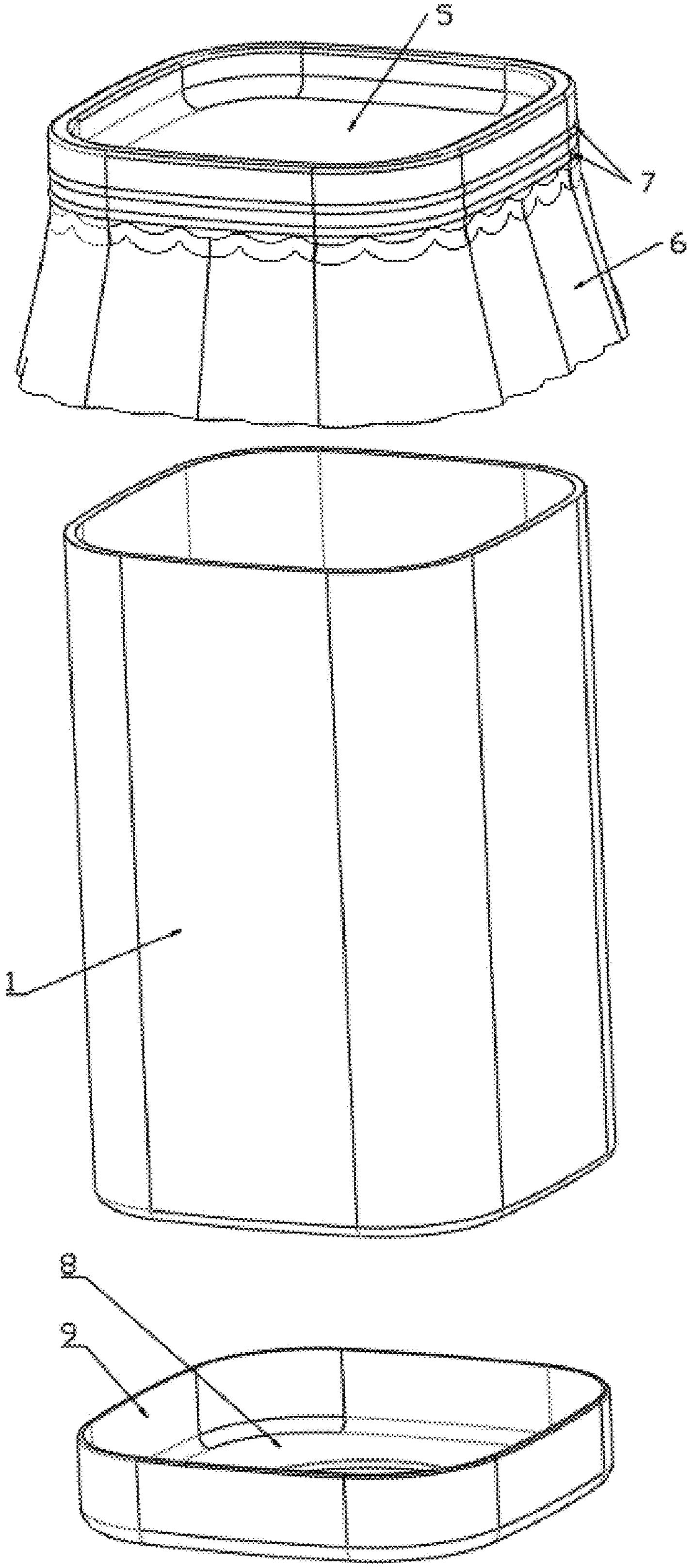
FIG. 2 is a schematic structural exploded diagram of a freshness-retaining sealed jar according to the present disclosure.
Figure 3:
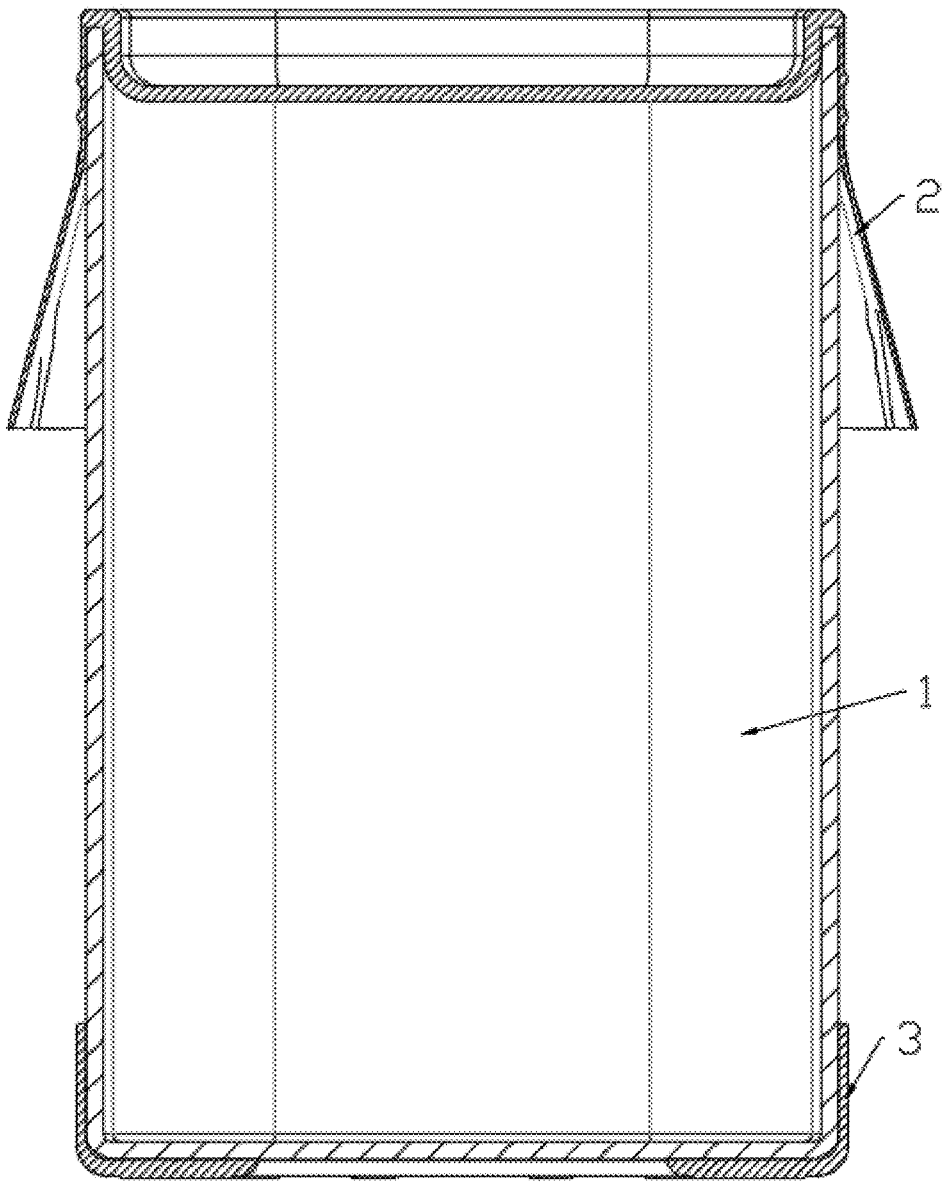
FIG. 3 is a schematic planar diagram of a freshness-retaining sealed jar according to the present disclosure.
Figure 4:
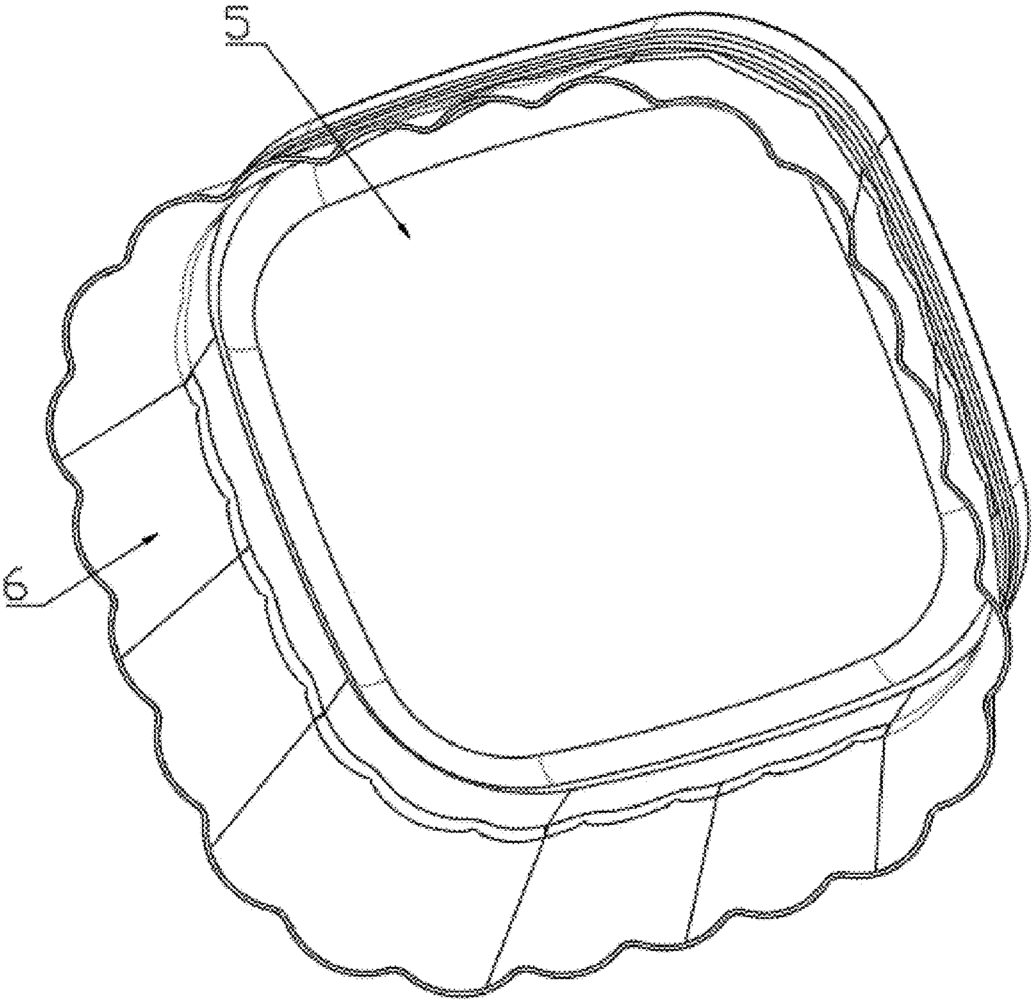
FIG. 4 is a schematic structural diagram of a silicone lid a freshness-retaining sealed jar according to the present disclosure.
Figure 5:
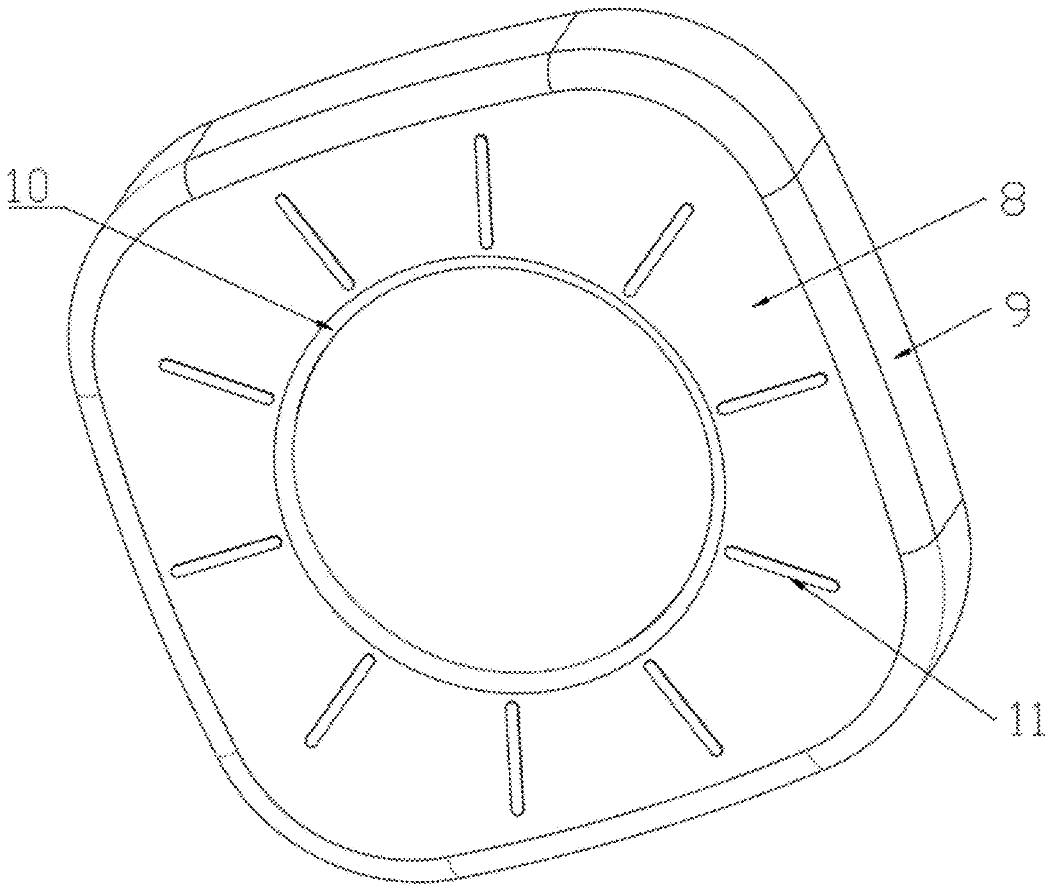
FIG. 5 is a schematic structural diagram of a bottom silicone cover of a freshness-retaining sealed jar according to the present disclosure.

As shown in FIG. 1, FIG. 2, and FIG. 5, a bottom silicone cover 3 is arranged at a bottom of the glass jar 1. The bottom silicone cover 3 includes a bottom plate 8 and a ferrule 9 that are integrally formed. The ferrule 9 is arranged at a top edge of the bottom plate 8 and abuts against the outer side wall of the glass jar 1. A through hole 10 is provided in a center of a bottom of the bottom plate 8. A plurality of antislip protrusions 11 located on an outer side of the through hole 10 are arranged in a circumference of the bottom of the bottom plate 8, to achieve an antislip effect. Specifically, a height of the ferrule 9 is 100 to 160 mm. The bottom silicone cover 3 is configured to protect the glass jar 1.

Principle of the Present Disclosure

During use, green vegetables to be pickled are put into the glass jar 1. The silicone rubber band 4 binds the curtain-like enclosure 6 to the outer side wall of the glass jar 1. In this case, the opening of the glass jar 1 is sealed and covered with the silicone lid 2, so that the sealing and freshness retaining performance is good. Meanwhile, gas generated in the glass jar 1 during pickling can only prop up the concave top plate 5 and make the concave top plate 5 deform. When the freshness-retaining sealed jar needs to be opened, the silicone rubber band 4 is pushed outwards under force and is removed from the curtain-like enclosure 6, and then the silicone lid 2 can be removed conveniently. It is easy to open or close the jar, and a silicone material is environmentally friendly, gets moldy hardly, and has low costs. When the freshness-retaining sealed jar is placed at a corner, the silicone lid 2 and the bottom silicone cover 3 can well prevent the glass jar 1 from being broken.

The above describes the present disclosures and its implementations. Such descriptions are not restrictive. The accompanying drawings only show one of the implementations of the present disclosure, but actual structures are not limited to this. In summary, if a person of ordinary skill in the art is inspired by the present disclosure and, without deviating from the purpose of creation of the present disclosure, creatively designs structural methods and embodiments similar to the technical solution, the structural methods and embodiments shall all fall within the protection scope of the present disclosure.

What is claimed is:

1. A freshness-retaining sealed jar, comprising:

a glass jar (1) with an opening at a top thereof, a silicone lid (2) detachably arranged at the top of the glass jar (1); and a bottom silicone cover (3) detachably arranged at a bottom of the glass jar (1);

wherein a silicone rubber band (4) is arranged at a periphery of the silicone lid (2) and is configured to bind the silicone lid (2) to the opening of the glass jar (1) and configured to be deformed in a direction away from an outer surface of the glass jar (1) to be detachable from the silicone lid (2); the silicone lid (2) includes a concave top plate (5) and a curtain-like enclosure (6) that are integrally formed; the curtain-like enclosure (6) extends downwardly from a bottom edge of the concave top plate (5) and is configured to wrap around an outer side of the glass jar (1); a side wall of the glass jar (1) surrounding the opening is arranged between an inner side wall of the concave top plate (5) and an inner side wall of the curtain-like enclosure (6); the concave top plate (5) comprises a top surface recessed from a top surface of the silicone lid (2) and the top surface of the concave top plate (5) is configured to be deformed upwardly when air generated in the glass jar (1) applies a force onto the silicone lid (2);

wherein the concave top plate (5) together with the curtain-like enclosure (6) and the silicone rubber band seals the opening of the glass jar (1), thereby forming the freshness-retaining sealed jar; and wherein the bottom silicone cover (3) comprises a bottom plate (8) and a ferrule (9) that are integrally formed; the ferrule (9) is arranged at a top edge of the bottom plate (8) and abuts against an outer side wall of the glass jar (1), a through hole (10) is provided in a center of a bottom of the bottom plate (8); and a plurality of antislip protrusions (11) located on an outer side of the through hole (10) are arranged in a circumference of the bottom of the bottom plate (8).

2. The freshness-retaining sealed jar according to claim 1, wherein limiting protrusions (7) located on two sides of the silicone rubber band (4) are arranged on an upper wall of an outer side of the curtain-like enclosure (6).

3. The freshness-retaining sealed jar according to claim 1, wherein the curtain-like enclosure (6) is in a shape of a horn cover; and the glass jar (1) is in a shape with a large top opening and a small bottom.

4. A freshness-retaining sealed jar for pickling vegetables, comprising:

a glass jar (1) with an opening at a top thereof, a silicone lid (2) detachably arranged at the top of the glass jar (1); and a bottom silicone cover (3) detachably arranged at a bottom of the glass jar (1);

wherein a silicone rubber band (4) is arranged at a periphery of the silicone lid (2) and is configured to bind the silicone lid (2) to the opening of the glass jar (1) and configured to be deformed in a direction away from an outer surface of the glass jar (1) to be detachable from the silicone lid (2); the silicone lid (2) includes a concave top plate (5) and a curtain-like enclosure (6) that are integrally formed; the curtain-like enclosure (6) extends downwardly from a bottom edge of the concave top plate (5) and is configured to wrap around an outer side of the glass jar (1); a side wall of the glass jar (1) surrounding the opening is arranged between an inner side wall of the concave top plate (5) and an inner side wall of the curtain-like enclosure (6); the concave top plate (5) comprises a top surface recessed from a top surface of the silicone lid (2) and the top surface of the concave top plate (5) is configured to be deformed upwardly when air generated in the glass jar (1) applies a force onto the silicone lid (2);

wherein the concave top plate (5) together with the curtain-like enclosure (6) and the silicone rubber band seals the opening of the glass jar (1) and is deformable by propping up by gas generated in the glass jar during pickling; and wherein the bottom silicone cover (3) comprises a bottom plate (8) and a ferrule (9) that are integrally formed; the ferrule (9) is arranged at a top edge of the bottom plate (8) and abuts against an outer side wall of the glass jar (1), a through hole (10) is provided in a center of a bottom of the bottom plate (8); and a plurality of antislip protrusions (11) located on an outer side of the through hole (10) are arranged in a circumference of the bottom of the bottom plate (8).

5. The freshness-retaining sealed jar for pickling vegetables according to claim 4, wherein limiting protrusions (7) located on two sides of the silicone rubber band (4) are arranged on an upper wall of an outer side of the curtain-like enclosure (6).

6. The freshness-retaining sealed jar for pickling vegetables according to claim 4, wherein the curtain-like enclosure (6) is in a shape of a horn cover; and the glass jar (1) is in a shape with a large top opening and a small bottom.

* * * * *